E. B. CUSHMAN.
FRICTION CLUTCH.
APPLICATION FILED OCT. 17, 1910.

1,008,309.

Patented Nov. 14, 1911.

Witnesses
Frank B. Wooden
M. E. Tracy

Everett B. Cushman, Inventor,
by C. A. Snow & Co.
Attorneys.

UNITED STATES PATENT OFFICE.

EVERETT B. CUSHMAN, OF LINCOLN, NEBRASKA.

FRICTION-CLUTCH.

1,008,309.  Specification of Letters Patent.  Patented Nov. 14, 1911.

Application filed October 17, 1910. Serial No. 587,453.

*To all whom it may concern:*

Be it known that I, EVERETT B. CUSHMAN, a citizen of the United States, residing at Lincoln, in the county of Lancaster and State of Nebraska, have invented a new and useful Friction-Clutch, of which the following is a specification.

This invention relates to a friction clutch and consists in the novel construction as hereinafter shown, described and claimed.

The object of the invention is to provide a clutch of the character indicated which is of simple structure and which includes a minimum number of parts.

The structure includes a member adapted to be fixed to a shaft and which is termed a driving member and a member which is loosely mounted upon the shaft and which is termed the driven member. Spring means is provided for holding the said members in engagement with each other and a lever operated mechanism is provided for moving the driven member so that it frictionally disengages the driving member. The parts are so arranged that the spring is housed between the driving and driven members and when the said driving and driven members are disconnected from a shaft they are meshed one within the other and are so retained in proper relation to each other.

Figure 1:
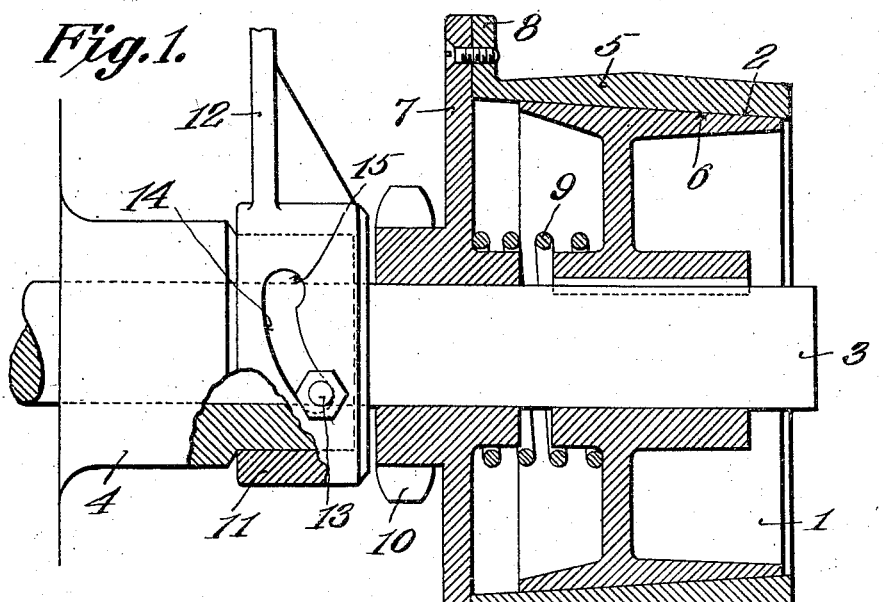
Figure 2:
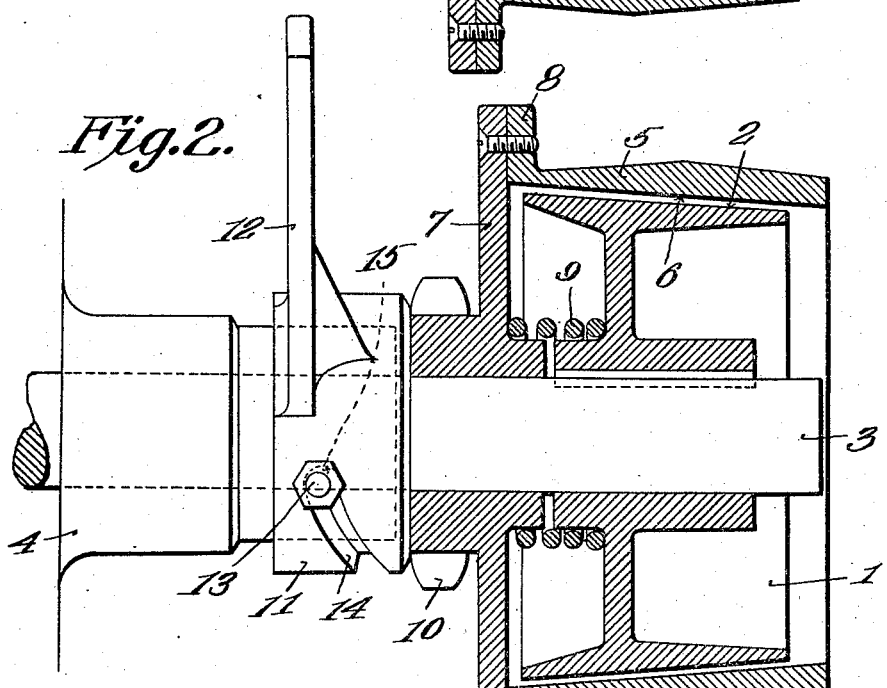

In the accompanying drawing:—Figure 1 is a sectional view of the clutched parts in elevation showing the driving and driven members frictionally engaging each other. Fig. 2 is a similar view showing the driving and driven members frictionally disengaged from each other.

The clutch consists of a driving member 1 which is in the form of a wheel having a conical periphery 2: The said member is adapted to be fixed to a shaft 3 which is journaled in a bearing 4. A barrel 5 surrounds the periphery of the driving member 1 and is provided with a conical bore 6 which at times is adapted to have frictional engagement with the conical periphery 2 of the member 1. A disk 7 is loosely journaled upon the shaft 3 and is attached at its edge portion to a flange 8 provided at the end of the barrel 5. The barrel 5 and disk 7 constitutes the driven member of the clutch mechanism. A coiled spring 9 is interposed between the intermediate portion of the member 1 and the disk 7 and surrounds the shaft 3. The said spring 9 is under tension with a tendency to hold the disk 7 away from the intermediate portion of the member 1 and consequently the said spring has a tendency to maintain the inner conical bore 6 of the barrel 5 in frictional engagement with the conical periphery 2 of the member 1. The disk 7 is provided with a concentrically arranged sprocket wheel 10. A collar 11 is journaled upon that end portion of the bearing 4 which is adjacent the disk 7 and is provided with a lever or handle 12 which is rigidly attached thereto. A stud 13 is fixed to the bearing 4 and projects through a cam slot 14 provided in the collar 11. At that end of the slot 14 which is remote from the disk 7 the said slot is provided in that side which is nearest the said disk 7 with a notch 15 which is adapted to receive the stud 13 at times. As the collar 11 is rotated upon the end portion of the bearing 4 through the instrumentality of the handle or lever 12 and the edges of the slot 14 moves transversely across the stud 13 the said collar 11 is moved longitudinally along the bearing 4 at the same time that it is partially rotated thereon. Therefore during such manipulation of the collar 11 is moved toward or away from the intermediate portion of the disk 7. A sprocket chain may be trained around the sprocket wheel 10 carried by the disk 7 or a belt may be trained around the periphery of the barrel 5.

The operation of the clutch is as follows: The shaft 3 is maintained in rotation which carries around with it the clutch member 1. When the collar 11 is turned upon the bearing 4 so that it is moved away from the disk 7 the tension of the spring 9 comes into play and forces the disk 7 away from the intermediate portion of the member 1 which brings the conical bore 6 of the barrel 5 into frictional engagement with the conical periphery 2 of the member 1 and thus the barrel 5 and its fixed attachment are frictionally engaged with the member 1 and the said barrel and its said attachment will rotate with the said member. When it is desired to frictionally disengage the driving and driven member the collar 11 is partially rotated upon the bearing 4 so that the edges of the groove 14 moves transversely of the stud 13 until the stud arrives at the notch 15 provided in the inner side of the said grooved portions. This movement on the part of the collar 11 also moves the said collar longitudinally beyond the end of the bearing 4 and when the said collar comes contact with the intermediate portion of the disk 7 the said disk is also moved against the tension of the spring 9 and the inner conical bore 6 of the barrel 5 is frictionally disengaged from the conical periphery 2 of the member 1. Therefore the member 1 may continue to rotate with the shaft 3 but the barrel 5 and its fixed attachment will come to a state of rest. At the same time the tension of the spring 9 comes into play and is sufficient to force the disk 7 away from the intermediate portion of the member 1 and remove the collar 11 longitudinally of the bearing 4 to hold the edge of the notch 5 about the side portion of the stud 13. Thus when the driving and driven members are frictionally disengaged from each other there is but slight possibility that the collar 11 may be accidentally turned and frictional contact between the said members established for the reason that the end portion of the notch 15 offers an obstruction to the free passage of the edge portions of the cam groove 14 along the stud 13. To assemble the parts before the disk 7 is attached to the flange 8 of the barrel 5 the said barrel is placed around the member 1 and the spring 9 is placed in position against the intermediate portion of the said member 1. The disk 7 is then attached to the end of the barrel 5 and the flange 8 thereof and inasmuch as the said disk 7 closes the larger end of the bore 6 and the larger end of the member 1 is of greater diameter than the smaller end of the bore 6 the said member 1 is retained in position within the barrel 5.

Having described the invention what I claim as and desire to secure by Letters Patent is:

In combination with a bearing having a shaft journaled therein, a friction clutch comprising a member fixed to the shaft and having a conical periphery, a barrel journaled upon the shaft and having a conical bore receiving the periphery of said member, a head for said barrel, a spring interposed between the said member and the head of the barrel, and a rotatable member mounted upon the bearing and adapted to move longitudinally thereof, and engage the head of the barrel and force the said barrel out of engagement with the periphery of the first mentioned member.

In testimony that I claim the foregoing as my own, I have hereto affixed my signature in the presence of two witnesses.

EVERETT B. CUSHMAN.

Witnesses:
 JAMES ADAMS,
 O. F. HOLCOMB.